3,458,501
5-(m-SULFAMOYLPHENYL)-1,3-DIHYDRO-2H-
1,4-BENZODIAZEPIN-2-ONE
Stanley C. Bell, Narberth, and George L. Conklin,
Havertown, Pa., assignors to American Home Products Corporation, New York, N.Y., a corporation
of Delaware
No Drawing. Filed Feb. 9, 1967, Ser. No. 614,805
Int. Cl. C07d 53/06; A61k 27/00
U.S. Cl. 260—239.3                              4 Claims

ABSTRACT OF THE DISCLOSURE

This invention is concerned with 5-(m-sulfamoylphenyl)-1,3-dihydro-2H-1,4-benzodiazepin - 2 - one which is pharmacological efficacious as a tranquilizing, anti-convulsant and anti-amoebic agent. Further, this invention is also concerned with 7-chloro-5-(2-chloro-5-sulfamoylphenyl)-1,3-dihydro-2H-1,4-benzodiazepin-2-one, 4-oxide and 7-chloro-5-(2-chloro-5-sulfamoylphenyl)-1,3-dihydro-3-hydroxy-2H-1,4-benzodiazepin-2-one acetate which are useful intermediates and are therapeutically active as anti-amoebic agents.

BACKGROUND OF THE INVENTION

A part of this invention is concerned with 5-(m-sulfamoylphenyl) - 1,3 - dihydro-2H-1,4-benzodiazepin-2-one having therapeutic activity as a tranquilizing, anti-convulsant and anti-amoebic agent. This compound is related to previously known benzodiazepines which were known to possess only tranquilizing and anti-convulsant properties. These prior art benzodiazepines and the process of their preparation are described in two co-pending patent applications, U.S. Ser. No. 285,500, filed on June 4, 1963, entitled "Benzodiazepine Compounds," now U.S. Patent No. 3,296,249 and U.S. Ser. No. 301,873, filed on Aug. 13, 1963, entitled "Process for Preparing 1,3-dihydro-5-aryl-2H-1,4-benzodiazepin-2-one 4-oxides," now abandoned.

SUMMARY OF THE INVENTION

The present invention is concerned with a new and novel compound which is known as 5-(m-sulfamoylphenyl)-1,3-dihydro-2H-1,4-benzodiazepin - 2 - one which is prepared by the process schematically illustrated as follows:

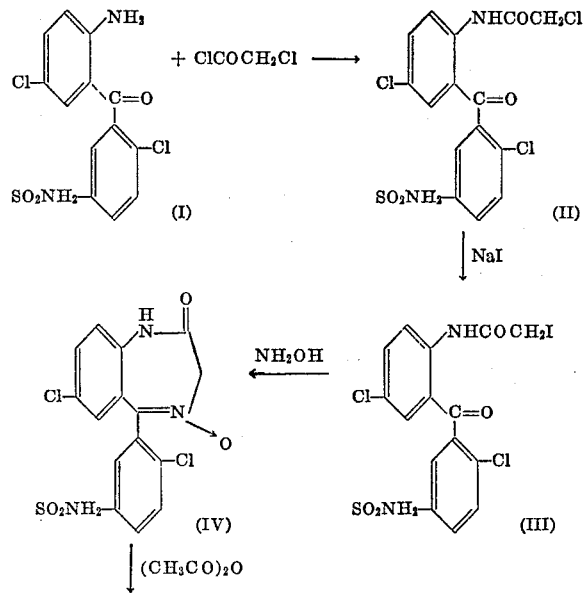

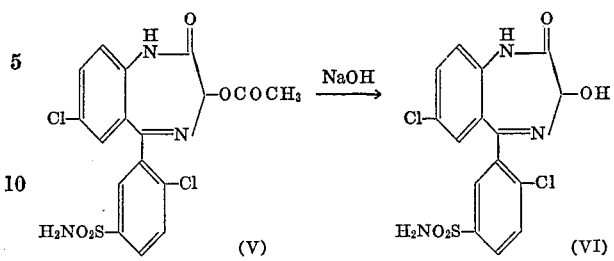

The first reaction of this process is effected by admixing and slightly warming 2-amino 2',5-dichloro-5'-sulfamoylbenzophenone (I) and chloroacetylchloride in dioxane. Thereafter, the reaction mixture is diluted with water and the precipitated 2,4'-dichloro-2'-(2-chloro-5-sulfamoylbenzoyl) acetanilide (II) is separated by filtration.

The 2,4'-dichloro-2' - (2-chloro - 5 - sulfamoylbenzoyl)-acetanilide is admixed with acetone and sodium iodide and then refluxed for about two hours. When the reaction is complete, the reaction mixture is cooled and the 4' - chloro-2-iodo-2'-(2-chloro-5-sulfamoylbenzoyl) acetanilide (III) is separated by conventional procedures, e.g. dilution, water and washing the precipitate with water.

The above prepared iodo compound (III) is then added to a water, ethanol and sodium hydroxide mixture containing hydroxylamine hydrochloride and refluxed for about a half hour. Thereafter, the reaction mixture is acidified with a mineral acid and diluted with a large quantity of water. The cyclized product (IV) is then separated by filtration and recrystallized by standard methods, such as, dissolution in ethanol-water sodium hydroxide mixture and precipitation with hydrochloric acid to afford 7-chloro-5-(2-chloro-5-sulfamoylphenyl)-1,3-dihydro-2H-1,4-benzodiazepin-2-one, 4 oxide (IV).

A mixture of the above prepared benzodiazepinone, oxide (IV), acetic acid and acetic anhydride is heated to about 100° C. for a period of about a half hour to about one hour and then concentrated to dryness. The residue is reconstituted with an alkanol and filtered to afford 7-chloro-5 - (2-chloro-5-sulfamoylphenyl) - 1,3-dihydro-3-hydroxy-2H-1,4-benzodiazepin-2-one acetate (V) which is then suspended in an alcohol, water, sodium hydroxide mixture and acidified with acetic acid to afford a solid 7-chloro-5 - (2-chloro-5-sulfamoylphenyl) - 1,3-dihydro-3-hydroxy-2H-1,4-benzodiazepin-2-one (VI) which may be purified by recrystallization from an alkanol.

The above mentioned 2-amino-2',5-dichloro-5'-sulfamoylbenzophenone (I) starting compound is readily prepared by procedures well known in the art, for example, reacting an appropriate 2-aminobenzophenone with chlorosulfonic acid.

The other reactants employed in the aforesaid process are commercially available.

In accord with the present invention, the new 5-(m-sulfamoylphenyl) - 1,3 - dihydro-2H-1,4-benzodiazepin-2-one has been found to possess interesting pharmaceutical properties which render it useful as a synthetic medicinal. More particularly, this compound in standard pharmacological tests has exhibited utility as a tranquilizing, anti-convulsant and anti-amoebic agent. Further, in accord with the present invention the new and novel 7-chloro - 5 - (2 - chloro-5-sulfamoylphenyl)-1,3-dihydro-2H-1,4-benzodiazepin-2-one, 4-oxide and 7-chloro-5-(2-chloro - 5 - sulfamoylphenyl)-1,3-dihydro-3-hydroxy-2H-1,4-benzodiazepin-2-one acetate have been found by standard pharmacological tests to be useful as anti-amoebic agents. These latter two compounds are also useful intermediates in the preparation of 5-(m-sulfamoylphenyl)-1,3-dihydro-2H-1,4-benzodiazepin-2-one.

When the compounds of this invention are employed for the aforesaid purposes, they may be administered alone or in combination with pharmaceutically acceptable carriers. For example, they may be administered orally in the form of tablets or capsules containing such excipients as starch, milk sugar, certain types of clay and so forth. They may be also administered orally in the form of a solution which may contain coloring and flavoring agents or it may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially lesss than the optimum dose of the compound. Thereafter, the dosage is increased by small increments until the optimum effect under the circumstances is reached. It will generally be found that when a compound of this invention is administered orally, larger quantities will be required to produce the same effect as a smaller quantity given parenterally. In general, the compounds of this invention are most desirably administered at a concentration level that will generally afford effective results without causing any harmful or deleterious side effects and preferably for tranquilizing and anticonvulsant purposes at a level that is in the range of from about 30 mg. to about 120 mg. per day, although as aforementioned variations will occur. For anti-amoebic purposes a dosage level that is in the range of from about 150 mg. to about 3000 mg. per day is most desirably employed in order to achieve effective results.

The following example is given by way of illustration and is not to be construed as a limitation of this invention, many variations of which are possible without departing from the scope.

EXAMPLE I

To a suspension of 12.0 g. of 2-amino-2′,5-dichloro-5′-sulfamoylbenzophenone in 100 ml. of dioxane there is added 8 ml. of chloroacetyl chloride in 25 ml. of dioxane. The reaction mixture is warmed slightly and the resultant solution then diluted with water to precipitate 2,4′-dichloro - 2′ - (2 - chloro-5-sulfamoylbenzoyl)acetanilide, M.P. 208–210° C.

The above prepared compound is refluxed in 150 ml. of acetone and 10.0 g. of sodium iodide. After two hours, the reaction mixture is cooled, diluted with water, the precipitate filtered and washed with ethanol. In this manner, there is obtained 16.0 g. of 4′-chloro-2-iodo-2′-(2-chloro - 5 - sulfamoylbenzoyl) - acetanilide, M.P. 200–202° C.

To a mixture of a refluxing solution of 300 ml. of ethanol, 100 ml. of water and 80 ml. of 4 N sodium hydroxide, there is added 25 g. of hydroxylamine hydrochloride and, thereafter, the above iodo compound is added. After refluxing for 20–25 minutes the reaction solution is acidified with about 90 ml. of 3 M hydrochloric acid and diluted with a large volume of water. A sticky solid is collected and suspended in ethanol giving 9.0 g. of product, M.P. 176–183° C. The compound is further recrystallized by dissolving in alcohol-water-sodium hydroxide solution and then reprepicitated with hydrochloric acid. The resulting 7-chloro-5-(2-chloro-5-sulfamoylphenyl)-1,3-dihydro - 2H - 1,4 - benzodiazepin-2-one, 4-oxide which has a M.P. of 195–198° C. and is obtained as a hydrate.

Analysis.—Calcd. for $C_{15}H_{11}Cl_2N_3O_4S \cdot H_2O$: C, 43.07; H, 3.13; N, 10.05; Cl, 16.95; S, 7.67. Found: C, 43.49; H, 3.38; N, 9.53; Cl, 16.9; S, 7.7.

A mixture of the above prepared 7-chloro-5-(2-chloro-5 - sulfamoylphenyl)-1,3-dihydro-2H-1,4-benzodiazepin-2-one 4-oxide (3.0 g.), 35 ml. of acetic acid and 5 ml. of acetic anhydride is heated on the steambath for 35–40 minutes. Thereafter, the reaction mixture is concentrated to dryness, alcohol added and filtered. In this manner, there is obtained 2.5 g. of product which is recrystallized from alcohol-water to obtain 7-chloro-5-(2-chloro-5-sulfamoylphenyl)-1,3-dihydro - 3 - hydroxy-2H-1,4-benzodiazepin-2-one, acetate, M.P. 195–198° C. as an alcoholate.

Analysis.—Calcd. for $C_{17}H_{13}Cl_2N_3O_5S \cdot C_2H_6O$: C, 46.73; H, 3.82; N, 8.61; Cl, 14.52; S, 6.57. Found: C, 46.63; H, 3.81; N, 8.35; Cl, 14.6; S, 6.9.

The above prepared 7-chloro-5-(2-chloro-5-sulfamoylphenyl)-1,3-dihydro - 3 - hydroxy-2H-1,4-benzodiazepin-2-one, acetate (0.4 g.) is suspended in alcohol-water-sodium hydroxide and the resultant solution acidified with acetic acid. The product is collected, washed with ethanol and isolated as a dihydrate of 7-chloro-5-(2-chloro-5-sulfamoylphenyl) - 1,3 - dihydro - 3 - hydroxy-2H-1,4-benzodiazepin-2-one.

Analysis.—Calcd. for $C_{15}H_{11}Cl_2N_3O_4S \cdot 2H_2O$: C, 41.29; H, 3.47; N, 9.63; Cl, 16.25; S, 7.35. Found: C, 40.94; H, 3.55; N, 9.22; Cl, 16.3; S, 7.3.

What is claimed is:

1. A compound selected from the group consisting of those having the formulae:

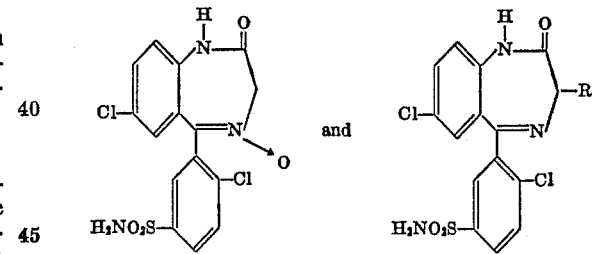

wherein R is selected from the group consisting of hydroxy and lower alkanoyloxy.

2. A compound as described in claim 1 which is: 7-chloro-5-(2-chloro-5-sulfamoylphenyl) - 1,3 - dihydro-3-hydroxy-2H-1,4-benzodiazepin-2-one.

3. A compound as described in claim 1 which is: 7-chloro-5-(2-chloro-5-sulfamoylphenyl) - 1,3 - dihydro-2H-1,4-benzodiazepin-2-one, 4-oxide.

4. A compound as described in claim 1 which is: 7-chloro-5-(2-chloro-5-sulfamoylphenyl) - 1,3 - dihydro-3-hydroxy-1,4-benzodiazepin-2-one acetate.

References Cited

UNITED STATES PATENTS 3,270,053  8/1966  Reeder et al. _____ 260—239.3

HENRY R. JILES, Primary Examiner

R. T. BOND, Assistant Examiner

U.S. Cl. X.R.

424—244